United States Patent [19]
Chabardes et al.

[11] 3,890,393
[45] June 17, 1975

[54] 2-METHYL-BUTADIENYL-SULPHONES
[75] Inventors: Pierre Chabardes, Rhone; Marc Julia, Paris; Albert Menet, Rhone, all of France
[73] Assignee: Rhone-Poulenc S.A., Paris, France
[22] Filed: Apr. 16, 1973
[21] Appl. No.: 351,343

[30] Foreign Application Priority Data
Apr. 17, 1972 France .............................. 72.13433

[52] U.S. Cl....... 260/607 R; 260/593 R; 260/675.5; 260/677 R; 260/680 R; 260/465.9; 260/556 R; 260/486 R; 260/551 R; 260/533 N; 260/544 Y
[51] Int. Cl.² ...................................... C07C 147/04
[58] Field of Search ..................... 260/607 R, 593 R

[56] References Cited
FOREIGN PATENTS OR APPLICATIONS
1,526,002   2/1967   France ............................... 260/607
1,483,715   5/1964   France ............................... 260/607

OTHER PUBLICATIONS
Rec. Trav. Chimiques–Van Zuydewijn pp. 1047–1062.

Primary Examiner—Lewis Gotts
Assistant Examiner—D. R. Phillips
Attorney, Agent, or Firm—Stevens, Davis, Miller & Mosher

[57] ABSTRACT

Sulphones of the formula $QSO_2CH=C(CH_3)-CH=CH_2$ wherein Q represents an optionally substituted, saturated or unsaturated terpene radical of 5n carbon atoms, $n$ being 1–9, apart from 3-methylbutadienyl and 2-butadienylmethyl, are intermediates for adding isoprene units. They are made from novel alkali metal 2-methylbutadienylsulphinates.

8 Claims, No Drawings

2-METHYL-BUTADIENYL-SULPHONES

This invention relates to 2-methylbutadienyl sulphones.

The present invention provides sulphones of the general formula:

$$Q-SO_2-CH=C(CH_3)-CH=CH_2 \quad (I)$$

in which Q represents a saturated or unsaturated terpene radical containing 5n carbon atoms, $n$ being an integer of 1 to 9, which is substituted or unsubstituted, with the proviso that Q does not represent a 3-methylbutadienyl radical or a 2-butadienylmethyl radical. The radical Q can be saturated or unsaturated with ethylenic and/or acetylenic unsaturation, and with conjugated and/or unconjugated ethylenic unsaturation. It can contain functional groups or be substituted by alkyl groups. When $n$ is 2 or more, Q can contain a ring to which alkyl groups and/or functional groups such as O= or —OH may be attached, the functional groups being free or protected. Examples of the functional groups in Q are:

an alcohol group, an ether group derived therefrom (e.g. an alkyl ether preferably with 1-6 carbon atoms in the alkyl group) or an ester derived therefrom with an inorganic or organic acid, (e.g. an alkanoic acid with preferably 1 to 6 carbon atoms), or a halogen (e.g. chlorine or bromine), a free or protected aldehyde group, an acid group (e.g. $CO_2H$) or a derivative thereof, such as an acid chloride (e.g. COCl), ester (e.g. COOR wherein R is an organic radical), amide (e.g. $CONR_1R_2$ wherein $R_1$ and $R_2$ are organic radicals or hydrogen) or nitrile (e.g. CN) and a $—SR_3$ or $—SO_2R_3$ group in which $R_3$ represents an alkyl, alkylaryl, aryl or aralkyl radical, each of which is preferably a hydrocarbon radical e.g. with 1 to 15 carbon atoms for the alkyl radical, 6 to 18 carbon atoms for the aryl and alkaryl radical and 6 to 19 carbon atoms for the aralkyl radical.

The terpene radical represented by Q preferably represents a group having a carbon skeleton of formula:

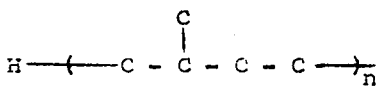

wherein $n$ is 1–9, each $C_5$ unit containing 0–2 ethylenic double bonds and 0–1 acetylenic bonds, the remaining valencies being satisfied by hydrogen atoms, or two adjacent $C_5$ units are joined to form a structure containing a ring of 6 ring carbon atoms, which can be substituted by a hydroxy or oxo group, or by a methyl group additional to the methyl substituents forming part of the carbon skeleton of $C_5$ units, and the chain of $C_5$ units can have one halogen substituent. The ring is usually a 2,6,6-trimethylcyclohex-1-enyl ring. Q can thus represent an isoprene or polyisoprene chain, which is saturated or unsaturated.

Important examples of radicals represented by Q are the 5-(2,6,6-trimethylcyclohex-1-enyl)-3-methylpenta-2,4-dienyl radical, or the geranyl, 3-methylbut-2-enyl, 4-halo-3-methylbut-2-enyl (preferably where the halogen is chlorine or bromine), farnesyl and retinyl radicals.

The sulphones of the invention can be prepared by reacting alkali metal 2-methyl-butadienyl-sulphinates with a halide of the formula Q—X, according to the equation:

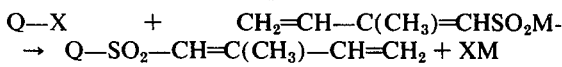

wherein X represents a halogen, preferably chlorine or bromine, and M represents an alkali metal atom e.g. sodium or preferably potassium. It is also possible to obtain the sulphones of the invention from a primary terpene alcohol of the formula Q—OH which reacts with 2-methyl-butadienyl-sulphinic acid prepared in situ from the alkali metal salt thereof in the presence of an inorganic or organic acid. In place of the primary alcohol it is also possible to employ one of its isomeric alcohols when a rearrangement during the reaction is possible.

Alkali metal 2-methyl-butadienyl-sulphinates are new products and are also part of the invention. They may be prepared from 1,1-dioxy-2,5-dihydro-3-methyl-thiophene, more commonly called the cyclic sulphone of isoprene, which is reacted with an alkaline agent, such as an alkali metal alcoholate (e.g. of sodium or potassium with an alkanol of 1 to 6 carbon atoms) or an alkali metal hydroxide (e.g. of sodium or potassium). This reaction causes the thiophene ring to be broken and yields the desired 2-methyl-butadienyl-sulphinate according to the equation:

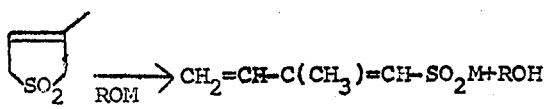

It is also possible to prepare the sulphones of the invention using these sulphinates obtained in situ by reacting the halide Q—X or the alcohol Q—OH with the cyclic isoprene sulphone in the presence of an alkaline agent.

Examples of terpene compounds employed to prepare the sulphones of the formula I are the halo compounds isoprene hydrochloride and hydrobromide, 1,4-dichloro- and 1,4-dibromo-methyl-butenes, geranyl chlorides and bromides, farnesyl chlorides and bromides, and retinyl chlorides and bromides, and alcohols 2-methyl-but-3-en-2-ol, 3-methyl-but-2-en-1-ol, geraniol, linalol, farnesol, β-vinyl-ionols, vitamin A alcohol and the isomeric vinyl-carbonol.

The reaction between the chosen alcohol and the alkali metal sulphinate is carried out in the presence of an inorganic or organic acid which liberates the sulphinic acid from its salt, in situ, and catalyses the reaction. It can be advantageous to carry out the reaction in a solvent such as a hydrocarbon, an alcohol or an ether. A temperature of −20° to +100°C., is usually used, and in the majority of cases it is of the order of +10° to +40°C., and preferably +15° to +25°C.

When the starting material is of formula QX, the reaction preferably takes place in a solvent or a mixture of solvents such as a hydrocarbon like hexane, benzene or toluene, an alcohol such as methanol or ethanol, a linear or cyclic ether such as diethyl ether, dioxan or tetrahydrofuran, or dimethylsulphoxide, dimethylformamide, dimethylacetamide or hexamethylphosphoramide. The reaction takes place easily under mild conditions and the isolation of the desired sulphone does not present any difficulties because the alkali metal halide formed in the reaction can be removed by simply washing the reaction mixture with water.

These compounds can be used in the synthesis of various terpene compounds. Thus it is possible to add to polyisoprene chains of various degrees of saturation by one isoprene unit. Due to their conjugated and activated double bonds, these compounds can be used in organic synthesis in reactions characteristic of such bonds.

The new sulphones may be used as starting materials for the preparation of the products described in our specification Ser. No. 351,342 filed on the same day as the present application, by the process described and claimed in claim 16 of said specification, that is to say, a compound of formula (I) may be reacted with a methylene compound of the formula R—CH$_2$—R$_1$ in the presence of a basic agent to give a sulphone of the formula:

$$QSO_2-CH-C(CH_3)=CH-CH_2-Ch\diagdown_{R_1}^{R} \qquad (II)$$

in which Q is as hereinbefore defined and each of R and R$_1$, which are the same or different, represents a radical of formula —CHO, —COR$_2$, —COOH, —COOR$_3$, —CONR$_5$R$_5$, —CN, —SO$_2$R$_4$, —SO$_3$—R$_5$ or —NO$_2$, wherein each of R$_2$, R$_3$, R$_4$ and R$_5$ represents an alkyl or aryl radical, and R$_5$ can also represent a hydrogen atom.

The resulting sulphones may be polymerized by heating in a solvent in the presence of peroxidic compounds. The polymers can be used for insolubilization of enzymes because of their functional groups.

The following examples illustrate the invention.

EXAMPLE 1

8.25 g. of β-vinyl-ionol and 7.65 g. of potassium 2-methyl-butadienyl-sulphinate are introduced into a three-necked flask equipped with a dropping funnel, a nitrogen inlet and a condenser. 75 cm$^3$ of acetic acid are added rapidly to the reaction mixture which is kept at 13°C., and then the whole mixture is stirred for several hours. The acetic acid is removed under the vacuum provided by a vane-type pump (10$^{-1}$mm) and an orange mass is obtained to which 300 cm$^3$ of water and 100 cm$^3$ of diethyl ether are added. The ether layers are combined, washed with water, dried over magnesium sulphate and concentrated. 11.9 g. of a paste-like product are obtained, in which there are measured 75% of a product which, after recrystallisation from diisopropyl ether, has a melting point of 87°C., and which, in U.V. spectrography (as a solution in ethanol), has an absorption maximum at 271 nm (E$_{1cm}^{1\%}$ = 444) and at 236 nm (E$_{1cm}^{1\%}$ = 930). It corresponds to the formula:

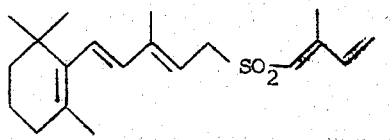

Degree of conversion 100% relative to the β-vinyl-ionol employed. Yield 71%.

Preparation of potassium 2-methyl-butadienyl-sulphinate. 16 g. of potassium metal are added slowly to 400 cm$^3$ of t-butyl alcohol and the mixture is heated for 4 hours at 70°C. The mixture is cooled to 50°C. and 54.4 g. of 1,1-dioxy-2,5-dihydro-3-methyl-thiophene are added. The mixture is left to react for 4 hours at 65°C., with stirring, the t-butanol is removed under vacuum and the residue is washed with twice 100 cm$^3$ of diethyl ether and filtered off. 67 g. of potassium 2-methyl-butadienyl-sulphinate are obtained.

EXAMPLE 2

A solution of 34.7 g. of potassium 2-methyl-butadienyl-sulphinate in 100 cm$^3$ of dimethylsulphoxide and 30 cm$^3$ of methanol are introduced into an apparatus identical to that of the preceding Example. The temperature of this solution is kept at 0°C., and a solution of 44 g. of geranyl bromide in 30 cm$^3$ of methanol is added slowly. The mixture is stirred at ambient temperature for several hours. The reaction mixture is then poured into 1,000 cm$^3$ of water + 500 cm$^3$ of diethyl ether. The aqueous layer is decanted and extracted with 3 times 100 cm$^3$ of diethyl ether. The combined ether layers are washed with water, dried over magnesium sulphate and concentrated; 36 g. of a pale yellow oil are obtained in which there are identified and measured, by U.V. spectrography and thin layer chromatography, 65% of a product corresponding to the formula:

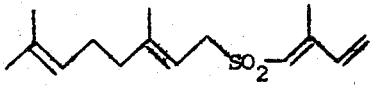

Degree of conversion 100%. Yield 50%.

EXAMPLE 3

A solution of 1.05 g. of 1-chloro-3-methyl-2-butene in 5 cm$^3$ of dimethylsulphoxide is added to a solution of 1.7 g. of potassium 2-methyl-butadienyl-sulphinate in 10 cm$^3$ of dimethylsulphoxide, in an apparatus identical to that of the preceding Example. The reaction mixture is left to react according to the conditions of Example 2 and is then treated in the same way. 1.9 g. of a solid white product, of 90% purity, and identified by I.R. spectrography, U.V. spectrography and N.M.R. as corresponding to the formula:

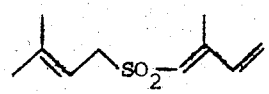

are thus obtained.

Degree of conversion 100%. Yield 85%.

EXAMPLE 4

20 cm$^3$ of anhydrous tetrahydrofuran and 2.64 g. of 1,1-dioxy-2,5-dihydro-3-methyl-thiophene are introduced, under an atmosphere of nitrogen, into an apparatus identical to that of the preceding Examples, and 2.24 g. of potassium t-butylate are added. After 20 minutes, 2.98 g. of 1-bromo-3-methyl-2-butene are slowly run in and then the reaction mixture is heated to 70°C. and kept at this temperature, with stirring, for 4 hours. The mixture is left to stand at ambient temperature and a white precipitate forms. The tetrahydrofuran is removed by distillation and the residue is taken up with water, neutralised to pH 7 with a 2N aqueous solution of hydrochloric acid and then extracted with diethyl ether. The ether extract is then dried over magnesium sulphate and the solvent is evaporated; a product of melting point = 75° – 76°C. is recovered and the same product as in Example 3, i.e. 1-(2-methyl-butadienyl-sulphonyl)-3-methyl-2-butene, is obtained with a yield of 70%.

EXAMPLE 5

13.4 g. of 1,4-dibromo-2-methyl-2-butene, 10 cm³ of dimethylsulphoxide and 5 cm³ of methanol are introduced into a 100 cm³ flask, and then the mixture is cooled to –25°C. and 8.5 g. of potassium 2-methyl-butadienyl-sulphinate dissolved in 20 cm³ of dimethylsulphoxide and 8 cm³ of methanol are run in over the course of 15 minutes. The reaction mixture is kept at this temperature for 3 hours and is then poured into a mixture of 200 cm³ of water and 100 cm³ of diethyl ether. The aqueous phase is decanted and extracted with 3 times 50 cm³ of diethyl ether. The combined ether layers are dried over magnesium sulphate and concentrated, and 13 g. of a viscous yellow compound are obtained therefrom, in which the compound of the formula:

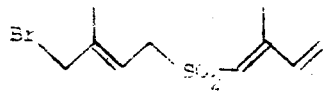

is identified and measured by nuclear magnetic resonance.
Degree of conversion 100%. Yield 56%.

We claim:
1. A sulphone of the general formula:
Q—SO$_2$—CH=C(CH$_3$)—CH=CH$_2$ (I)

in which Q represents a group having a carbon skeleton of formula:

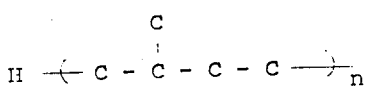

wherein $n$ is 1–9, each C$_5$ unit containing 0–2 ethylenic double bonds, the remaining valencies being satisfied by hydrogen atoms, or two adjacent C$_5$ units are joined to form a structure containing a ring of 6 ring carbon atoms, which can be substituted by a hydroxy or oxo group, and the chain of C$_5$ units can have one halogen substituent, with the proviso that Q does not represent a 3-methylbutadienyl radical or a 2-butadienylmethyl radical.

2. A sulphone as claimed in claim 1 wherein Q contains a 2,6,6-trimethylcyclohexyl-1-enyl ring.

3. A sulphone as claimed in claim 1 wherein Q represents an isoprene or polyisoprene chain, which is saturated or unsaturated.

4. A sulphone as claimed in claim 1 wherein Q represents a 5-(2,6,6-trimethylcyclohex-1-enyl)-3-methylpenta-2,4-dienyl radical, or a geranyl, 3-methylbut-2-enyl, 4-halo-3-methyl-but-2-enyl, farnesyl or retinyl radical.

5. 5-(2,6,6-Trimethyl-cyclohex-1-enyl)-3-methyl-1-(2-methyl-butadienyl-sulphonyl)-penta-2,4-diene.

6. 1-(2-Methyl-butadienyl-sulphonyl)-3,7-dimethylocta-2,6-diene.

7. 1-(2-Methyl-butadienyl-sulphonyl)-3-methylbut-2-ene.

8. 1-(2-Methyl-butadienyl-sulphonyl)-3-methyl-4-bromo-but-2-ene.

* * * * *